Aug. 20, 1946.     C. M. HINES     2,406,220
CONTROL APPARATUS
Filed Feb. 9, 1944     2 Sheets-Sheet 2
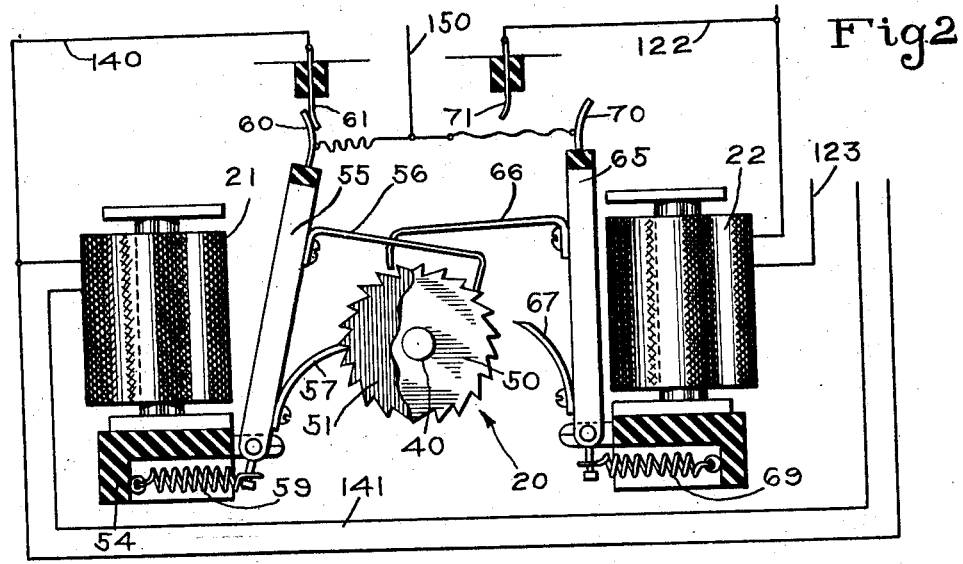
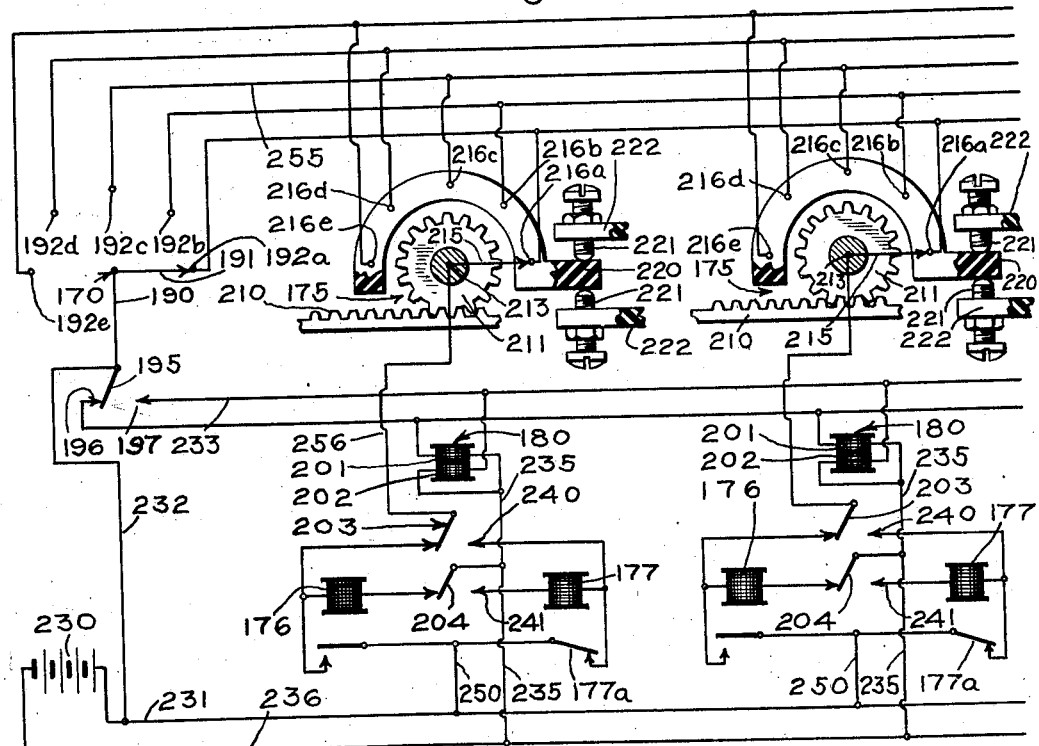
INVENTOR
Claude M. Hines
BY
ATTORNEY Patented Aug. 20, 1946

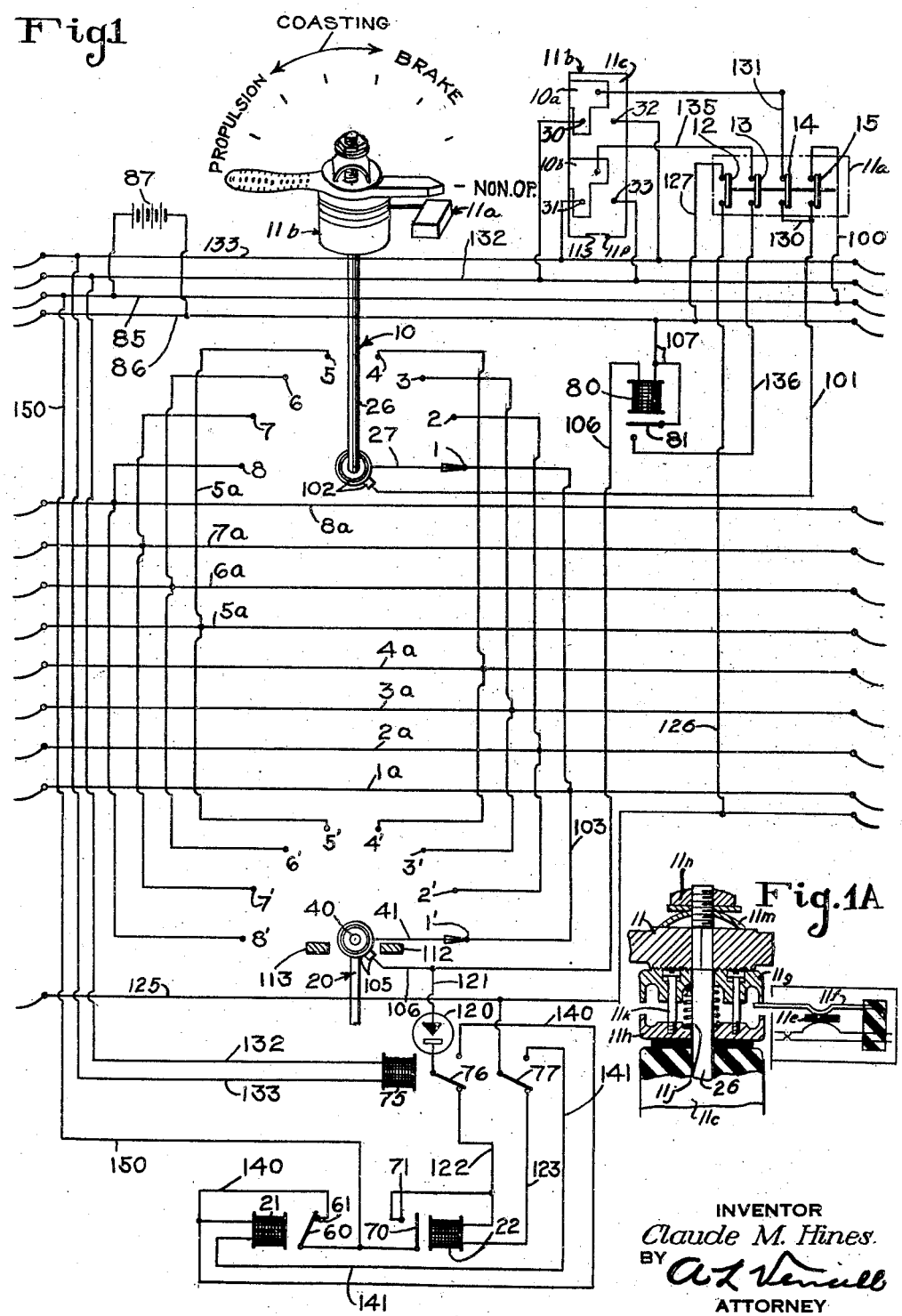

2,406,220

UNITED STATES PATENT OFFICE 2,406,220

CONTROL APPARATUS

Claude M. Hines, Pittsburgh, Pa., assignor to The Westinghouse Air Brake Company, Wilmerding, Pa., a corporation of Pennsylvania Application February 9, 1944, Serial No. 521,639

15 Claims. (Cl. 172—179)

This invention relates to electrical control apparatus, and more particularly to an electro-responsive control equipment operable to effect remote control of a plurality of operating units, such as the propulsion and braking controllers on a train of motor driven vehicle, or the maneuvering gear on a vessel having a number of engines.

It has been proposed to provide controlling means for a train of rail vehicles having individual power units and brake equipment, which control means can be actuated from the leading vehicle to operate the propulsion and braking controllers on all vehicles simultaneously. It is an object of my present invention to provide an electrical remote control apparatus adapted for association with a propulsion and braking system for individual vehicles or cars of the class shown in my prior patent No. 2,366,029 so as to control the propulsion means and braking means on each of a plurality of cars in synchronism.

Another object of the invention is to provide an electrical control system including one or more electro-responsive actuating devices which are simultaneously responsive to manipulation of a single controller at a remote point, regardless of the direction in which the controller is moved.

A further object of the invention is to provide an electrical control apparatus comprising a plurality of electro-responsive actuating devices that may, with minor differences in construction and arrangement of parts, be utilized to operate the maneuvering gear of a plurality of engines on a vessel, all of the actuating devices being simultaneously controlled by means of a single manually operated device.

Other objects and advantages of the invention will appear in the following more detailed description thereof, taken in connection with the accompanying drawings, in which Fig. 1 is a schematic view of one form of electric control apparatus embodying the invention and designed to be carried on a motor driven vehicle;

Fig. 1A is a fragmental sectional view, showing a detail of the controller shown in Fig. 1;

Fig. 2 is an enlarged detail view of an electro-responsive actuating device, or stepping relay device, which is illustrated schematically in Fig. 1; and Fig. 3 is a schematic view of a control apparatus embodying the invention in a different form suitable for effecting remote control of the throttles of a number of engines on a vessel.

Equipment shown in Figure 1

Referring to Fig. 1 of the drawings, the equipment there illustrated embodies the invention in a form suitable for installation on a motor driven rail vehicle, which is adapted to form a unit in a train. The brake and propulsion control apparatus shown in Fig. 1 can be conditioned either for operation to control all units in the train, or for operation as the local control equipment for one of the trailing vehicles in a train controlled from the head end. It will be assumed that the usual braking and propulsion apparatus is provided on the vehicle equipped with the apparatus shown in Fig. 1, and that the vehicle carries a single braking and propulsion controller arranged to be rotatively operated from a coasting position in one direction for governing propulsion of the vehicle, and in the opposite direction for governing application of the brakes. Such an apparatus is shown in my aforementioned Patent No. 2,366,029. It will further be understood that each vehicle in a train is equipped with the same electrical control apparatus, the apparatus on the several vehicles in a train being connected through the medium of suitable train wires, as indicated in Fig. 1 and hereinafter explained.

As shown in Fig. 1, the the multiple unit remote control apparatus for each vehicle comprises a manual controller, indicated generally by the reference character 10, having a removable operating handle 11 effective upon application to the shaft of the controller to close a switch bank 11a having four simultaneously operated switches 12, 13, 14 and 15, a reverser 11b having a pair of direction responsive switches 10a and 10b cooperative with the controller 10 as hereinafter explained, and a remotely disposed electro-responsive controller device, which may be termed the automatic controller 20, which is adapted to be actuated by means of a pair of stepping magnets 21 and 22, as hereinafter described.

The manual controller 10 is adapted to be operated by the engineer in charge of the train and comprises a rotary operating shaft 26 suitably mounted in a casing structure, not shown, and having a contact arm 27, which is suitably insulated from the shaft and extends outwardly into cooperative relation with a series of arcuately arranged stationary insulated contact elements 1 to 8, inclusive. The operating shaft 10 and contact arm 27 are thus operable through a plurality of positions by means of the removable operating handle 11, the positions with which the handle is associated being indicated in Fig. 1 as a coasting position 5, propulsion positions 6, 7 and 8 to the left of the coasting position, and brake positions 4, 3, 2 and non-operative position 1 to the right of the coasting position. It will be understood that the number of contacts and positions chosen will be determined by the type of service for which the equipment is intended.

It should be understood that the direction responsive switch elements 10a and 10b, and the bank of switch elements 12, 13, 14 and 15, are, in actual practice, assembled as cooperating parts of the manual controller 10, as indicated generally in Fig. 1. In order to show the electrical connections to these elements they are shown in schematic form in Fig. 1 in positions removed from the controller 10 and the handle 11. Any of a number of well known constructions may be utilized in associating these elements with the manual controller. For example, each of the switch elements 10a and 10b may be a T-segment secured on a rotary contact drum 11c and arranged to be shifted into engagement with one of a pair of spaced contact elements in response to initial movement of the operating handle 11, in accordance with the direction in which the handle is turned. The operating handle 11 is preferably so constructed as to have frictional slip contact with the contact drum which has a small amount of rotary movement as determined by a stationary stop pin 11p cooperating with a slot 11s in the contact drum. The handle 11 is thus effective to cause operation of the reversible switch elements 10a and 10b in response to a small increment of the initial movement of the operating handle and shaft 26 in a direction opposite that of the previous operation. As viewed in Fig. 1, initial movement of the handle 11 in a clockwise direction will set the respective switch elements 10a and 10b in engagement with stationary contact elements 30 and 31. Movement of the operating handle 11 in the opposite or counterclockwise direction will in like manner effect shifting of the switch elements 10a and 10b into contact with stationary contact elements 32 and 33, respectively.

The bank of switch elements 12, 13, 14 and 15 are likewise shown in schematic form in Fig. 1, it being understood, however, that these elements are constructed and arranged to be maintained in their closed positions, as shown in Fig. 1, so long as the operating handle 11 remains mounted on the rotary shaft 26 of the manual controller. It will be further understood that the switch elements just mentioned are automatically restored to their circuit opening positions when the operating handle 11 is removed from the shaft 26, as would be the case when the vehicle carrying the equipment is coupled in a train behind a leading vehicle.

By way of example, the switch bank 11a may comprise a suitable casing or support stationarily fixed in a position adjacent the rotary shaft 26 of the controller 10 and, contained in the casing, a plurality of switches of the telephone type (only one of which is visible in Fig. 1A) disposed in side-by-side relation and corresponding respectively to the switch elements 12, 13, 14 and 15 shown in Figure 1. Extending across and fixed to the upper contact finger of each of the switches in the switch bank 11a is an insulating contact bar or member 11e which is adapted to be engaged by a flexible leaf spring element 11f secured at one end to a fixed support in the casing of the switch bank 11a, the leaf spring element 11f projecting out of the casing of the switch bank through a suitable vertical slot provided in the casing.

The free end of the leaf spring element 11f extends between the outer edges or lips of two cup-shaped collars 11g and 11h mounted on the rotary shaft 26 of the controller 10.

The upper surface of the collar 11g is serrated and engages in interlocked relation a similarly serrated surface at the bottom surface of the hub portion of the controller handle 11 to insure rotation of collar 11g with the controller handle 11. The lower collar 11h is locked to the upper collar 11g for rotation therewith, as by a plurality of screws 11k, the head and shank of which are slidably held in corresponding bores provided in the upper collar 11g, and the lower threaded end of which screws into correspondingly threaded holes formed in the lower collar 11h. The two collars 11g and 11h are thus locked together for simultaneous rotation by the controller handle 11.

A coil spring 11j interposed between the two collars 11g and 11h in surrounding relation to the controller shaft 26 serves to urge the upper collar 11g upwardly with respect to the lower collar 11h when the operating handle 11 is removed from the upper squared end of the controlled shaft 26.

The lower collar 11h has a frictional slip contact with the upper annular surface of the contact drum 11c whereby rotation of contact drum 11c is effected in response to rotation of the operating handle 11. The lower end of the contact drum 11c is supported as by a thrust bearing (not shown) on a fixed support in the casing of the controller 10. It will be apparent, therefore, that the force of the spring 11j is effective to urge the upper collar 11g upwardly when the controller handle 11 is removed from the controller shaft 26.

In order to hold the controller handle 11 in its proper position on the shaft 26 to effect compression of the spring 11j and the consequent movement of the upper collar 11g into close proximity to the lower collar 11h, a spring clip 11m is interposed between the handle and a securing nut 11n screwed to the outer threaded end of the controller shaft 26.

It will be understood that when the upper collar 11g is compressed toward the lower collar 11h, as it is when the controller handle 11 is properly installed on the controller shaft 26, it engages the free end of leaf spring 11f of the switch bank 11a and bends it downwardly to effect closure of all of the separate switches or switch elements in the switch bank simultaneously. Conversely, it will be apparent that when the controller handle 11 is removed from the upper end of the controller shaft 26, the downward force exerted by the upper collar 11g on the free end of the leaf spring element 11f if removed and consequently the inherent bias of the leaf spring 11f as well as the inherent bias of the upper contact finger of each of the switch elements is effective to cause separation of the contact fingers of each individual switch element of the switch bank.

The automatic propulsion and braking controller 20 is illustrated diagrammatically in Fig. 1 as comprising a rotary shaft 40 suitably journaled in a casing structure (not shown), an insulated contact arm 41 fixed on the rotary shaft and rotatable therewith in cooperation with a series of arcuately arranged and spaced insulated stationary contact elements 1' to 8' which correspond in number and relative positions to the respective contact elements 1 to 8 of the manual controller 10. Conductors 1a–8a, inclusive are provided for connecting the pairs of associated contact elements, contact element 1 being connected through conductor 1a to contact element 1', for example. It will be understood that the rotary shaft 40 is constructed and arranged to operate suitable propulsion controlling means and brake controlling means, such as the apparatus described in my aforementioned patent.

The stepping magnets 21 and 22 are constructed and arranged to actuate the rotary shaft 40 and contact arm 41 with a step-by-step movement through the medium of a pawl and ratchet mechanism, in accordance with alternate pick-up and drop-out of one or the other of the magnets in response to operation of the manual controller 10. Referring to Fig. 2, the electro-responsive propulsion and braking controller 20 is illustrated in greater detail to insure a proper understanding of the relationship between the stepping magnets and the rotary shaft 40 of the device. As shown in this view, the rotary shaft 40 is mounted between the electromagnets 21 and 22, and carries a pair of ratchet wheels 50 and 51 which are adapted for operation to turn the shaft in opposite directions.

The magnet 21 is carried on a base structure 54 to which is pivotally connected an arm 55 having secured thereto a flexible leaf-spring pawl element 56 operatively aligned with the ratchet teeth on the ratchet wheel 50. The arm 55 is made of magnetic material and is adapted to be attracted toward the magnet 21 or to the left as viewed in Fig. 2, upon energization of the magnet as hereinafter explained. Such operation of the arm 55 will cause the pawl element 56 to rotate the ratchet wheel 50 and shaft 40 in a counterclockwise direction. A coil spring 59 is attached to an extension of the arm 55 for urging that member away from the magnet 21 and into the normal position, wherein a leaf-spring prong element 57 attached to the arm engages the ratchet wheel 51, as illustrated in the drawings. The prong 57 serves to prevent undesired rotation of the shaft 40 is a counterclockwise direction while arm 55 is in its dropped-out position. The arm 55 is also provided with a switch contact member 60 which is normally held in engagement with a stationary contact element 61 by the force of the spring 59. The initial movement of the arm 55 to its picked-up position shifts the prong 57 out of engagement with the teeth of ratchet wheel 51 before the hooked end of the pawl element 56 picks up a tooth on the ratchet wheel.

The magnet 22 is constructed and arranged to control operation of another pivotally mounted arm 65 having a flexible leaf-spring pawl element 66 which is cooperative with the other ratchet wheel 51 for turning the shaft 40 clockwise in response to energization of the magnet 22. A leaf-spring prong member 67 is attached to the arm 65 for engagement with the teeth of the ratchet wheel 51 for preventing undesired clockwise rotation of shaft 40 while the arm is disposed in its normal position under pressure of a coil spring 69. Similarly, as in the case of prong 57, the prong 67 is shifted out of engagement with the teeth of ratchet wheel 50 before the hooked end of pawl element 66 picks up a tooth on the ratchet wheel. While arm 65 is disposed in its normal position, a switch contact element 70 thereon is held in contact with a stationary contact element 71. Arm 65 is shown in Fig. 2, for a reason explained hereinafter, in its actuated position to which it is moved in response to energization of magnet 22.

Referring again to Fig. 1 of the drawings, it will be noted that both sets of contact elements 60 and 61, and 70 and 71 are illustrated in association with the magnets 21 and 22. As hereinafter explained, both stepping magnets 21 and 22 are constructed and arranged for energization to effect quick pick-up of the respective arms 60 and 70, but are provided with a slow-drop-out characteristic so that the arms, when once picked up, will be retained momentarily following deenergization of the stepping magnets before being returned to normal position by the spring 59 or 69, as the case may be.

The control equipment for a single car illustrated in Fig. 1 further includes a polarized relay 75, which comprises an electro-magnet adapted to control a pair of movable contact members 76 and 77. The polarized relay 75 is constructed and arranged to actuate the contact members 76 and 77 simultaneously to either one of two positions as determined by the direction of the current energizing the winding, and to maintain the contact in that position until the direction of the flow of current through the winding of the relay is reversed. As hereinafter explained, the winding of the polarized relay 75 is adapted to be energized through the medium of a circuit which includes the direction responsive switch contact members 10a and 10b controlled by the manual controller 10, the positioning of the latter contact members determining the direction of current flowing through the magnet winding of the relay 75.

The equipment also comprises a relay 80 of the neutral type having a single back contact member 81, which is connected in series relation with the direction responsive switch contact members 10a and 10b so as to be effective, when picked-up as presently pointed out, to interrupt the circuit for energizing the winding of the polarized relay 75.

Electrical power for energizing the control apparatus on the vehicle is supplied through the medium of a pair of bus wires designated 85 and 86, which may be connected to corresponding bus wires on other units of the train and to a suitable source of electrical energy, such as the battery 87 shown in Fig. 1.

It should be understood that the manual controller device 10 is provided with a suitable guard (not shown) which will permit removal or installation of the removable handle 11 only while the controller device is disposed in the non-operating position, as shown in Fig. 1. The guard is designed to prevent removal of the handle from the controller device unless the handle is first moved to the non-operating position. As hereinbefore explained, the manual controllers on all trailing vehicles in a train are conditioned for non-operation and the handles removed therefrom in order to insure proper control of the electro-responsive braking and propulsion system from the active manual controller 10 on the leading vehicle.

It will now be assumed that the equipment shown in Fig. 1 is that carried on a leading or control vehicle in a train, and that the handle 11 has been duly applied to the shaft 26 to effect closure of the four associated switches 12, 13, 14 and 15. It will also be assumed that previous operation of the manual controller 10 to the non-operative position, as shown, has positioned the direction responsive switch elements 10a and 10b in contact with the elements 30 and 31, and that the movable contact elements 76 and 77 associated with the polarized relay 75 remain in the positions in which they are illustrated. It will be understood that the polarized relay 75 is not energized at this time, however, because of energization of the neutral relay 80 through a circuit which includes the positive bus wire 85, a conductor 100, switch contact element 15, a conductor 101, a brush and slip ring 102 associated with contact arm 27 of the controller 10, the contact element 1, a conductor 103, the contact element 1' engaged by the contact arm 41 of the automatic controller 20, a slip ring and brush 105, a conductor 106, the winding of the relay 80, and a return conductor 107 leading to the negative bus wire 86. The movable contact element 81 of the relay 80 is thereby picked-up as shown for preventing energization of the polarized relay 75.

Upon the installation of the operating handle 11 another circuit also is completed for energizing the winding of one of the stepping magnets, in this case that of the stepping magnet 22, although it should be understood that with the manual controller and the automatic controller in non-operative positions, the stepping magnet is not at this time actuated to move the shaft 40 and contact arm 41. It will be noted that suitable stop elements 112 and 113 are associated with the automatic controller 20 for limiting movement of the contact arm 41 in both directions beyond the respective contact elements 1' and 8'. Current for energizing the stepping magnet 22 as just explained is supplied from the positive bus wire 85 by way of a circuit including the series-connected contact arms 27 and 41 already described, and flows from the conductor 106 through a one-half wave rectifier 120, a conductor 121, the switch contact element 76, a conductor 122, the winding of the stepping magnet 22, a conductor 123, the switch contact element 77, and a return bus wire 125, which is connected by way of a conductor 126, the switch element 12, and a conductor 127 to the negative bus wire 86. The rectifier 120 serves to prevent undesired energization of the winding of relay 80 each time one or the other of the stepping relays 21 and 22 is energized during a stepping operation. Unnecessary operation of relay 80 is thus prevented, as will be more apparent from subsequent description.

With the brake and propulsion equipment thus conditioned for operation, the motorman can effect simultaneous operation of the manual controller 10 and the automatic controller 20, and of all other electro-responsive automatic controllers on the vehicles throughout the train, by moving the handle 11. Initial movement of the handle in a counterclockwise direction is effective to cause the reversible switch elements 10a and 10b to move into contact with the respective stationary contact elements 32 and 33, and the handle may then be further moved to operate the controller shaft 26 and contact arm 27 to any selected position, such as the coasting position with the contact arm in engagement with the stationary contact element 5, for example. The circuit for energizing the winding of the neutral relay 80 is thereby interrupted, since the contact arm 27 has been moved away from the contact element 1, and the back contact member 81 of the relay accordingly assumes its dropped-out or closed position.

With the neutral relay 80 deenergized, a circuit for energizing the winding of the polarized relay 75 is established in such a manner as to cause the movable contact elements 76 and 77 to be actuated to a position corresponding to that just assumed by the direction responsive switch contact elements 10a and 10b. The circuit through which the relay 75 is thus energized includes the positive bus wire 85, the conductor 100, the switch element 15, a conductor 130, the switch contact element 14, a conductor 131, switch contact elements 10a and 32, a conductor 133, the winding of the polarized relay 75, a conductor 132, the switch contact elements 33 and 10b, a conductor 135, the switch element 13, a conductor 136, the contact element 81 of the neutral relay and conductor 107 leading to the negative bus wire 86. Current supplied to the winding of the polarized relay 75 through the circuit just traced is effective to cause operation of the contact elements 76 and 77 to a position corresponding to the direction of flow of current through the winding. As viewed in Fig. 1, the contact member 76 is thereby positioned to connect the conductor 121 to a conductor 140, and contact member 77 is caused to connect the conductor 125 to a conductor 141, for rendering the stepping relay 22 inoperative while completing a circuit for energization of the other stepping relay 21. The circuit through which the stepping relay 21 is now adapted to be energized comprises the positive bus wire 85, a conductor 150, the relay contact members 60 and 61, the conductor 140, the winding of the relay 21, the conductor 141, the switch contact element 77, and the train wire 125, which is connected to the negative bus wire 86 as previously explained.

Upon energization of the winding of the stepping magnet 21, the contact arm 60 is picked up, while the pawl member 56 thereon see Fig. 2) is actuated to rotate the shaft 40 one step in a counterclockwise direction to bring the contact arm 41 (see Fig. 1) into contact with the stationary contact element 2'. By this same movement of the contact member 60, the circuit for energizing the stepping relay 21 is interrupted, so that the contact member is accordingly restored to its dropped-out position. The operation just described is then repeated, the stepping magnet 21 continuing to be alternately picked-up and dropped out to advance the shaft 40 of the automatic controller in step-by-step manner toward the coasting position.

When the contact arm 41 of the electro-responsive controller has been moved into contact with the stationary contact element 5', corresponding to the coasting position of the movable handle 11, a circuit is established for again energizing the winding of the relay 80 through the series related contact arms 41 and 27, which circuit includes, beginning with the contact arm 27, the stationary contact element 5, a conductor 5a, the stationary contact element 5' of the controller 20, the contact arm 41 thereof, the conductor 106, the winding of the relay 80, and the return conductor 107 leading to the negative bus wire. At the same time, a circuit is also established for energizing the winding of the stepping magnet 21 independently of the back contact 60 thereof, which circuit includes the conductor 106 already mentioned, the rectifier 120, conductor 121, switch contact element 76, conductor 140, the winding of the relay 21, conductor 141, switch contact element 77 and the conductor 125 leading to the negative bus wire 86.

It may here be pointed out that a reason for constructing the stepping magnets 21 and 22 for a slow drop-out operation is to prevent premature drop-out of the associated contact elements, depending upon which stepping magnet is being operated, an instant before the contact arm 41 of the automatic controller 20 reaches a position coincident with the selected position of the contact arm 27 of the manual controller, in response to pick-up of the stepping magnet. An undesired extra impulse of the stepping magnet which might otherwise cause the contact arm 41 to be advanced one position beyond that of the contact arm 27 is thus prevented. Accordingly, when the contact arm 41 reaches a position corresponding to the position of the contact arm 27, the winding of the stepping magnet 21 remains energized so that further operation of the contact arm 41 ceases. It will thus be seen that the apparatus functions to cause the contact arm 41 to be moved automatically to and held in the position corresponding to that to which the contact arm 27 has been manually moved.

From the foregoing description, it will be evident that if the operating handle 11 is further shifted in a counterclockwise direction, to move the contact arm 27 into engagement with the stationary contact element 7, for example, the operation just described will be repeated, the electro-responsive automatic controller 20 bein actuated through the medium of the stepping magnet means 21 to move the contact arm 41 until it reaches the contact element 7'. It will, of course, be understood that with the controller in this position, the propulsion controlling apparatus with which the equipment shown in Fig. 1 is associated will be operated to drive the vehicle in the usual way.

Subsequent operation of the handle 11 in a clockwise direction is effective to cause operation of the automatic controller 20 in the same direction. It is deemed unnecessary to trace the circuits established during such operation, since these circuits will be readily apparent from the description already presented, it being borne in mind that initial clockwise movement of the manual controller 10 effects movement of the reversible switch elements 10a and 10b into contact with the elements 30 and 31, respectively, thereby causing energization of the polarized relay 75 to shift the contact elements 76 and 77 into the positions in which they are shown in Fig. 1. It will be understood that the stepping relay 22 is thereby conditioned for operation to actuate the shaft 40 and contact arm 41 until they assume a position corresponding to that selected by operation of the manual controller.

Since each of the contact elements 1 to 8 of the manual controller 10 is connected to the corresponding contact element of the group of elements 1' to 8' in the electro-responsive automatic controller 20, by means of the respective conductors 1a to 8a, which are suitably arranged to be connected so as to extend throughout the train, remote control operation of the automatic controller 20 on each trailing vehicle can be effected in response to operation of the equipment on the leading vehicle. Thus all of the local automatic controllers on the units or vehicles in the train can be operated substantially in synchronism with the manual controller of the leading vehicle, on which the operating handle is installed. It will also be observed that the conductors 133 and 132 connected to the polarized relay 75 are adapted to extend throughout the train, as are the bus wires 85 and 86, and the conductor 125. By reason of the fact that the four switches 12, 13, 14 and 15 on the leading vehicle are closed upon installation of the operating handle 11, while the same switches associated with the manual controllers on the trailing vehicles remain in circuit-open position, the windings of the individual polarized relays 75 on all vehicles of the train are thus conditioned for control through the circuit which includes the direction responsive switch contact elements 10a and 10b carried on the leading vehicle.

It will also be apparent that when the operating handle 11 is removed from the shaft of the manual controller on each of a plurality of vehicles in a train and installed on the shaft 26 of the leading vehicle, the engineer will be able to control the operation of the stepping relays actuating the contact arms 41 on all units in synchronism with movement of the manually actuated contact arm 27 on the leading unit. The fact that the contact arm 27 of the manual controller on each of the trailing vehicles will remain in its non-operative position cannot effect control of the associated contact arm 41 of the automatic controller 20 on that vehicle from the head end of the train, since the open switch 15 on the trailing vehicle has isolated, that is, disconnected the local contact arm 27 from the bus wire 85.

The equipment shown in Fig. 1 is thus constructed and arranged to provide an entirely electrical control of both propulsion and braking for one or more similarly equipped vehicles, and may be readily conditioned for operation either as the actuating equipment governing an entire train, or as a remotely controlled equipment responsive to operation of another similar apparatus on a leading train unit.

*Equipment shown in Figure 3*

In Fig. 3 there is shown a schematic view of electrical apparatus embodying the invention in the form suitable for effecting uniform remote control of the multiple throttle operating devices on a vessel having a plurality of Diesel engines or other power units. In this case the apparatus involves a single manual controller constructed and arranged to govern simultaneous operation of several electro-responsive throttle controllers that are actuated by means of stepping magnets of the type hereinbefore described. The equipment illustrated in Fig. 3 comprises a manual controller 170, two electro-responsive throttle controllers, each indicated generally by the reference character 175, a pair of stepping magnet devices 176 and 177 constructed and arranged to operate each of the throttle controllers, and a relay device 180 associated with each pair of stepping magnet devices for conditioning one or the other for operation, as hereinafter explained.

The manual controller 170 comprises a suitable casing structure (not shown) having a rotatable shaft 190 on which is mounted a manually operable contact arm 191, which is adapted to be moved into contact with any one of a plurality of arcuately arranged contact elements 192a, 192b, 192c, 192d and 192e. The manual controller 170 further comprises a direction responsive switch element 195 which is associated with the shaft 190 in the same manner as are the contact members 10a and 10b shown in Fig. 1, it being understood that the switch element 195 is adapted to be moved into engagement with a stationary contact element 196 upon initial movement of the contact arm 191 in a clockwise direction, and into engagement with another stationary contact element 197 upon initial movement of the contact arm in a counter-clockwise direction.

The direction responsive switch element 195 is constructed and arranged to control the direction of energizing current supplied to the relay device 180, which comprises a pair of coils 201 and 202, a switch contact element 203 and a switch contact element 204, both of which contact elements are adapted to be simultaneously shifted from one position to the other in accordance with selected energization of one of the coils 201 and 202. The switch contact elements 203 and 204 perform the same function as do the switch contact elements 76 and 77 shown in Fig. 1, the positions of these switch elements determining which of the two stepping magnets 176 and 177 is to be rendered operative in response to manipulation of the controller 170.

According to the invention each of the throttle controllers 175 may comprise a movable operating rack element 210 for actuating a throttle (not shown) in accordance with rotary movement of a gear member 211 having a plurality of teeth engageable with complementary teeth formed on the operating rack element 210. The gear member 211 for each throttle controller is secured to a rotary shaft 213, which is constructed and arranged for rotation through the medium of a suitable ratchet and pawl means actuated by one or the other of the stepping magnets 176 and 177, the construction of this mechanism being similar to that shown in Fig. 2 and already described. The rotary shaft 213 has secured thereto a contact arm 215 which is adapted to be moved into contact with any of the arcuately arranged stationary contact elements 216a, 216b, 216c, 216d and 216e, in response to operation of the manual controller 170 as hereinafter explained. Each group of the stationary contact elements 216 may be mounted on an adjustable insulating frame 220, one end of which is arranged to be clamped between a pair of set screws 221 mounted in suitable stationary members 222. It will be evident that this construction will facilitate adjustment of the insulating frame 220 to bring the contact elements 216 into any desired position with respect to the idling position of the associated shaft 213, in the case of each separate engine unit.

The operation of the equipment shown in Fig. 3 is similar in principle to that hereinbefore described in connection with the equipment shown in Fig. 1. Assuming that the contact arm 191 of the manual controller 170 is initially positioned in contact with the stationary contact element 192a, and that the contact arms 215 of the respective throttle controllers 175 are likewise positioned in engagement with the corresponding stationary contact elements 216a, as shown in Fig. 3, the operator may effect simultaneous operation of all controllers by moving the manual contact arm 191 in a counterclockwise direction, until it is brought into contact with the contact element 192c, for example. Initial movement of the contact arm 191 of the manual controller in this direction effects shifting of the direction responsive switch element 195 into contact with the stationary contact element 197. Current is then supplied from a suitable source of electrical energy, such as a battery 230, for energizing the winding 201 of the relay 180, the circuit therefor comprising a bus wire 231 connected to the positive terminal of the battery, a conductor 232, switch contact elements 195 and 197, a conductor 233, the windings 202 of the respective relays 180, and suitable return conductors 235 leading to a bus wire 236 connected to the negative terminal of the battery.

With the windings 202 of the relays 180 thus energized, the respective pairs of movable contact elements 203 and 204 are shifted out of the position in which they are shown in the drawings and into contact with stationary contact elements 240 and 241, respectively, thereby rendering operative the stepping magnet 177 associated with each of the throttle control devices. It should be understood that as schematically represented in Fig. 3, the stepping relay 177 associated with each of the throttle controllers 175 is adapted for operation to effect rotation of the shaft 213 and contact arm 215 in a counterclockwise direction.

In response to movement of the contact arm 191 of the manual controller 170 from the stationary contact element 192a to the contact element 192c, as assumed in the preceding paragraph, the stepping magnet 177 is alternately energized, by flow of current through a circuit including the bus wire 231, a conductor 250, the relay contact member 177a, the coil of the stepping magnet, switch contact elements 241 and 204, conductor 235 and the bus wire 236, and then deenergized upon pick-up of the contact element 177a. It will be understood that each operation of the contact element 177a is accompanied by movement of the corresponding contact arm 215 and shaft 213 of the associated throttle controller 175 one step toward the position corresponding to that to which the contact arm of the manual controller has been shifted.

When the contact arm 215 of each of the throttle controllers reaches the stationary contact element 216c, corresponding to the positioning of the contact arm 191 of the manual controller 170 in contact with contact element 192c, circuits are established for maintaining energized the associated stepping relay magnets 177, which circuits include, in each case, the bus wire 231, conductor 232, contact arm 191 of the manual controller, contact element 192c, a conductor 255 connected to the stationary contact element 216c of each throttle controller 175, the contact arm 215 of each throttle controller, a conductor 256, switch contact elements 203 and 240, the winding of the stepping magnet 177, contact elements 241 and 204, and conductor 235 leading to the bus wire 236. Further operation of the ratchet and pawl mechanism associated with the relay switch contact element 177a is thus stopped.

From the foregoing description it will be understood that the manual controller 170 may be actuated in either direction to effect a corresponding operation of each of the several throttle controllers 175 simultaneously and in exactly the same increments or steps.

It will thus be apparent that, without altering the operative principle of my invention, an equipment embodying features thereof may be constructed and arranged for providing multiple remote control of propulsion and braking apparatus throughout a train of vehicles, or with slight structural changes an equipment embodying the invention may be adapted to control a plurality of throttle devices or other maneuvering gear on a vessel.

Having now described my invention, what I claim as new and desire to secure by Letters Patent is:

1. In an electrical remote control equipment, in combination, a manual controller including a movable contact member cooperative with a plurality of spaced stationary contact elements, an automatic controller having a like number of stationary contact elements and a movable contact member cooperative therewith, each of said contact elements of said manual controller being electrically connected with the corresponding contact element of said automatic controller, stepping relay mechanism constructed and arranged to operate said automatic controller in either direction, and polarized relay means operative in response to movement of said manual controller and according to the direction of movement thereof for conditioning said stepping relay mechanism for operation of said automatic controller in the same direction, all of said elements being cooperative to render said stepping relay mechanism inoperative when said movable contact members of the respective controllers are disposed in contact with connected stationary contact elements.

2. In an electrical remote control equipment, in combination, a manual controller including a movable contact member cooperative with a plurality of spaced stationary contact elements, an automatic controller having a like number of stationary contact elements and a movable contact member cooperative therewith, each of said contact elements of said manual controller being electrically connected with the corresponding contact element of said automatic controller, stepping relay mechanism including movable contact means and constructed and arranged to actuate said automatic controller when alternately energized and deenergized through the medium of said movable contact means, and other relay means constructed and arranged to effect normally constant energization of said stepping relay mechanism, rendering it inoperative, when the respective movable contact members of both said controllers are similarly disposed in contact with connected stationary contact elements.

3. In an electrical remote control equipment, in combination, a manual controller including a movable contact member cooperative with a plurality of spaced stationary contact elements, an automatic controller having a like number of stationary contact elements and a movable contact member cooperative therewith, each of said contact elements of said manual controller being electrically connected with the corresponding contact element of said automatic controller, stepping relay mechanism having movable contact means and constructed and arranged to actuate said automatic controller when alternately energized and deenergized through the medium of said movable contact means, and other relay means responsive to operation of said manual controller and adapted to maintain a circuit through which said stepping relay mechanism can be normally energized to render it inoperative, such circuit being closed only when the respective movable contact members of both said controllers are similarly disposed in contact with connected stationary contact elements.

4. In an electrical remote control equipment, in combination, a manual controller including a movable contact member cooperative with a plurality of spaced stationary contact elements, an automatic controller having a like number of stationary contact elements and a movable contact member cooperative therewith, each of said contact elements of said manual controller being electrically connected with the corresponding contact element of said automatic controller, stepping relay mechanism including movable contact means and constructing and arranged to actuate said automatic controller when alternately energized and deenergized through the medium of said movable contact means, and directional relay means constructed and arranged for selective operation in response to movement of said manual controller to condition said stepping relay mechanism for movement of said automatic controller in a corrsponding direction, until the respective movable contact members of both controllers are similarly disposed in contact with a connected pair of stationary contact elements.

5. In an electrical remote control equipment, in combination, a manual controller including a movable contact member cooperative with a plurality of spaced stationary contact elements, an automatic controller having a like number of stationary contact elements and a movable contact member cooperative therewith, each of said contact elements of said manual controller being electrically connected with the corresponding contact element of said automatic controller, a stepping relay device operable to actuate said automatic controller in one direction, another stepping relay device operable to actuate said automatic controller in the opposite direction, polarized relay means responsive to initial movement of said manual controller for conditioning one or the other of said stepping relay devices for operation to actuate said automatic controller in a corresponding direction, and means associated therewith for rendering inoperative the active stepping relay device when the respective movable contact members of said manual controller and said automatic controller are similarly disposed in contact with a connected pair of stationary contact elements.

6. A remote control unit for a railway vehicle comprising a manual controller having a removable operating member movable in two directions through a range of different positions, a remotely situated automatic controller constructed and arranged for operation through a corresponding range of positions, electro-responsive stepping magnet mechanism operative to actuate said automatic controller in either direction, means for establishing electrical circuits for controlling energization of said stepping magnet mechanism in accordance with operation of said manual controller, train wire means constructed and arranged for connection to effect energization of said electrical circuits of said unit from a counterpart control unit on another vehicle, and means responsive to removal of said operating member from said local manual controller for rendering the latter device inoperative to effect energization of said circuits when such connections are established.

7. An electrical remote control equipment for actuating the braking and propulsion apparatus of a railway vehicle, comprising the combination of a manual controller including a movable contact member cooperative with a plurality of spaced stationary contact elements, a remotely situated automatic controller having a like number of stationary contact elements and a movable contact member cooperative therewith, a plurality of conductors constructed and arranged to connect corresponding pairs of said stationary contact elements of said controllers, each of said conductors having means for establishing connection with a corresponding conductor of a counterpart equipment of another vehicle, electro-responsive stepping relay mechanism constructed and arranged to operate said automatic controller, other relay means for conditioning said stepping relay mechanism for operation when said movable contact member of the manual controller is operated, until the movable contact member of said automatic controller is brought into contact with a stationary contact element connected to that engaged by the first mentioned movable contact element member, means for effecting connection of said stepping relay mechanism to the corresponding mechanism of a counterpart equipment on another vehicle, and means associated with manual controller for isolating same to permit the control of said equipment from said counterpart unit.

8. In an electrical remote control equipment, in combination, a manual controller having an operating member shiftable over an operating range into any one of a plurality of different positions, an automatic controller having an operating member shiftable over an operating range into a plurality of different positions corresponding in relative location to the positions of the operating member of the said manual controller, reversible stepping relay mechanism operative to shift the operating member of said automatic controller in opposite directions, means responsive to the movement of the operating member of said manual controller from one of its positions to a different position for conditioning the stepping relay mechanism automatically to operate thereafter to cause movement of the operating member of the automatic controller in a direction corresponding to the direction of movement of the operating member of the manual controller, and means rendered effective when the operating member of the automatic controller reaches a position corresponding to the said different position of the operating member of the manual controller for terminating operation of said stepping mechanism.

9. In an electrical remote control equipment, in combination, a manual controller having an operating member shiftable over an operating range into any one of a plurality of different positions, an automatic controller having an operating member shiftable over an operating range into a plurality of different positions corresponding in relative location to the positions of the operating member of the said manual controller, reversible stepping relay mechanism operative to shift the operating member of said automatic controller in opposite directions, and means rendered effective when the operating member of the said manual controller is shifted out of one of its positions to a different position for automatically controlling said stepping mechanism in a manner to cause it to thereafter continue to shift the operating member of the automatic controller in step-by-step operation in a direction corresponding to the direction of movement of the operating member of the manual controller, said last means being rendered effective when the operating member of the automatic controller reaches a position corresponding to the said different position of the operating member of the manual controller for terminating operation of the stepping mechanism.

10. In an electrical remote control equipment, in combination, a manual controller having a movable contact member and a plurality of spaced stationary contact elements with which said movable contact member cooperates, an automatic controller having a movable contact member and a plurality of stationary contact elements corresponding in number and relative location to the contact elements of the said manual controller, means electrically connecting each of the contact elements of the manual controller with a corresponding contact element of the automatic controller, reversible stepping relay mechanism operative to shift the movable contact member of the automatic controller in either direction, means responsive to the direction of movement of the movable contact member of the manual controller for conditioning the stepping relay mechanism to shift the movable contact member of the automatic controller in a corresponding direction, and electroresponsive means operating on a circuit including said electrically connected contact elements of the said manual and automatic controllers and rendered effective when the movable contact member of the manual controller is moved out of one of its positions to a different position for causing the stepping relay mechanism to operate thereafter automatically to move the movable contact member of the automatic controller toward the position corresponding to the different position to which the movable contact member of the manual controller is moved and effective when the movable contact member of the automatic controller engages a cooperating contact element corresponding in position to the position of the stationary contact element engaged by the movable contact member of the manual controller in its said different position for terminating operation of the stepping relay mechanism.

11. In an electrical remote control equipment, in combination, a manual controller having a movable contact member and a plurality of spaced stationary contact elements with which said movable contact member cooperates, an automatic controller having a movable contact member and a plurality of stationary contact elements corresponding in number and relative location to the contact elements of the said manual controller, means electrically connecting each of the contact elements of the manual controller with a corresponding contact element of the automatic controller, reversible stepping relay mechanism operative to shift the movable contact member of the automatic controller in either direction, a directional switch device instantly responsive to a reversal of movement of the movable contact member of the manual controller for conditioning the stepping relay mechanism to shift the movable contact member of the automatic controller in a direction corresponding to the direction of movement of the movable contact member of the manual controller, and a relay operating on a circuit including said electrically connected contact elements of the manual and automatic controllers for initiating operation of the stepping mechanism when the movable contact member of the manual controller is shifted out of one of its positions to a different position and for terminating operation of the stepping relay mechanism when the movable contact member of the automatic controller engages an associated contact element corresponding in position to the position of the stationary contact element engaged by the movable contact member of the manual controller in its said different position.

12. In an electrical remote control system, in combination, a plurality of automatic controllers, a plurality of manual controllers, a common operating handle for operating any one of the manual controllers, means operatively associating all of said automatic controllers with all of said manual controllers, and means associated with each of the manual controllers and operatively responsive to installation and removal of the said common operating handle from the corresponding manual controller for rendering only that one of said manual controllers having an operating handle installed thereon operative to control all of the automatic controllers in synchronism through the medium of the last said means.

13. In an electrical remote control system, in combination, a plurality of automatic controllers, a plurality of manual controllers corresponding in number to the number of the said automatic controllers, means operatively associating each of the manual controllers with all of the automatic controllers whereby operation of any one of said manual controllers is effective to cause corresponding synchronous operation of all of said automatic controllers, a single operating handle adapted to be selectively installed on any one of the manual controllers, and means associated with each of the manual controllers responsive to the presence or absence of the controller handle for rendering only that manual controller having the handle installed thereon effective to control the automatic controllers.

14. In an electrical remote control system, in combination, a plurality of manual controllers each of which has a movable contact member and a plurality of stationary contact elements with which the movable contact member cooperates in different positions thereof, a plurality of automatic controllers corresponding in number to the number of manual controllers, each of the automatic controllers having a movable contact member and a plurality of stationary contact elements disposed in correspondence with the relative location of the stationary contact elements of a corresponding one of the manual controllers with which the movable contact member cooperates in the different positions thereof, means electrically connecting each stationary contact element of a manual controller with a corresponding stationary contact element of all the other manual controllers and of the automatic controllers, reversible motive means for shifting the movable contact member of each of the automatic controllers in opposite directions, electroresponsive means electrically controlled over a circuit including the movable contact members of the manual controllers, the movable contact members of the automatic controllers, and the means electrically connecting the stationary contact elements of the manual controllers and automatic controllers, in a manner to cause the motive means of all of the automatic controllers to be operated, when the movable contact member of any one of the manual controllers is shifted from one of its positions to a different position, to move the corresponding movable contact member in a direction corresponding to the direction of movement of the movable contact member of the operated manual controller, and means for preventing all of the manual controllers except the operated one from being effective to control the motive means for the automatic controllers.

15. In a multiple unit electrical control system for a train of railway cars, the combination of a manual controller on each of the cars operative in either direction over a predetermined range of movement, an automatic controller on each of the cars operative in either direction over a range of movement corresponding to the range of movement of the manual controller on the corresponding car, means associating each of the manual controllers with the automatic controllers on a plurality of the cars in such a manner as to cause operation of the automatic controllers on said cars in correspondence with the operative movement of any one of said manual controllers on the different cars, a single operating handle adapted to be installed on only one of the manual controllers at any one time, and means associated with each of the manual controllers responsive to the presence or absence of the controller handle on the controller for rendering only that manual controller having the handle installed thereon effective to control the operation of the automatic controllers.

CLAUDE M. HINES.